United States Patent
Wu et al.

(10) Patent No.: US 8,392,203 B2
(45) Date of Patent: Mar. 5, 2013

(54) ENCODING METHOD AND SYSTEM

(75) Inventors: Jen-I Wu, Taipei Hsien (TW);
Chen-Wei Huang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 723 days.

(21) Appl. No.: 12/650,416

(22) Filed: Dec. 30, 2009

(65) Prior Publication Data

US 2010/0305954 A1    Dec. 2, 2010

(30) Foreign Application Priority Data

May 26, 2009   (CN) .......................... 2009 1 0302637

(51) Int. Cl.
*G10L 21/04* (2006.01)
*G10L 19/00* (2006.01)
(52) U.S. Cl. ....................................... 704/504; 704/212
(58) Field of Classification Search ........... 704/500–504
See application file for complete search history.

(56) References Cited

U.S. PATENT DOCUMENTS

| | | | | |
|---|---|---|---|---|
| 3,689,840 | A * | 9/1972 | Brown et al. | 375/246 |
| 6,122,618 | A * | 9/2000 | Park | 704/500 |
| 6,625,574 | B1 * | 9/2003 | Taniguchi et al. | 704/229 |
| 2010/0017196 | A1 * | 1/2010 | Ryu et al. | 704/201 |

* cited by examiner

*Primary Examiner* — Samuel G Neway
(74) *Attorney, Agent, or Firm* — Altis Law Group, Inc.

(57) ABSTRACT

An encoding system includes a sampling unit, a computing unit, a comparing unit, a quantifying unit, and an encoding unit. The sampling unit obtains first sample data of a current sampling point and second sample data of a previous sampling point. The computing unit computes a data difference between the first sample data and the second sample data. The data difference includes a numeral and a sign. The comparing unit determines whether the data difference is more than or equal to 0 and outputs a determining result. The quantifying unit quantifies the numeral of the data difference. The encoding unit encodes the numeral of the data difference with or without the sign according to the determining result.

11 Claims, 2 Drawing Sheets

ENCODING METHOD AND SYSTEM

BACKGROUND

1. Technical Field

The present disclosure relates to coding technologies, and particularly to an encoding method and system for encoding audio signals.

2. Description of Related Art

A differential pulse-code modulation capable of compressing audio signals commonly computes a data difference between first sample data of a current sampling point and second sample data of a previous sampling point of the audio signals, and then encodes the data difference to 4-bit codes. Each 4-bit code includes 1 bit sign code and 3 bits numerical codes. However, the sign code needs to occupy 1 bit of 4-bit codes, only 3 bits remain for encoding a numeral of the data difference, thus sound qualities of the audio signals encoded by the differential pulse-code modulation may not be acceptable.

Therefore, improved encoding methods and systems are desired.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
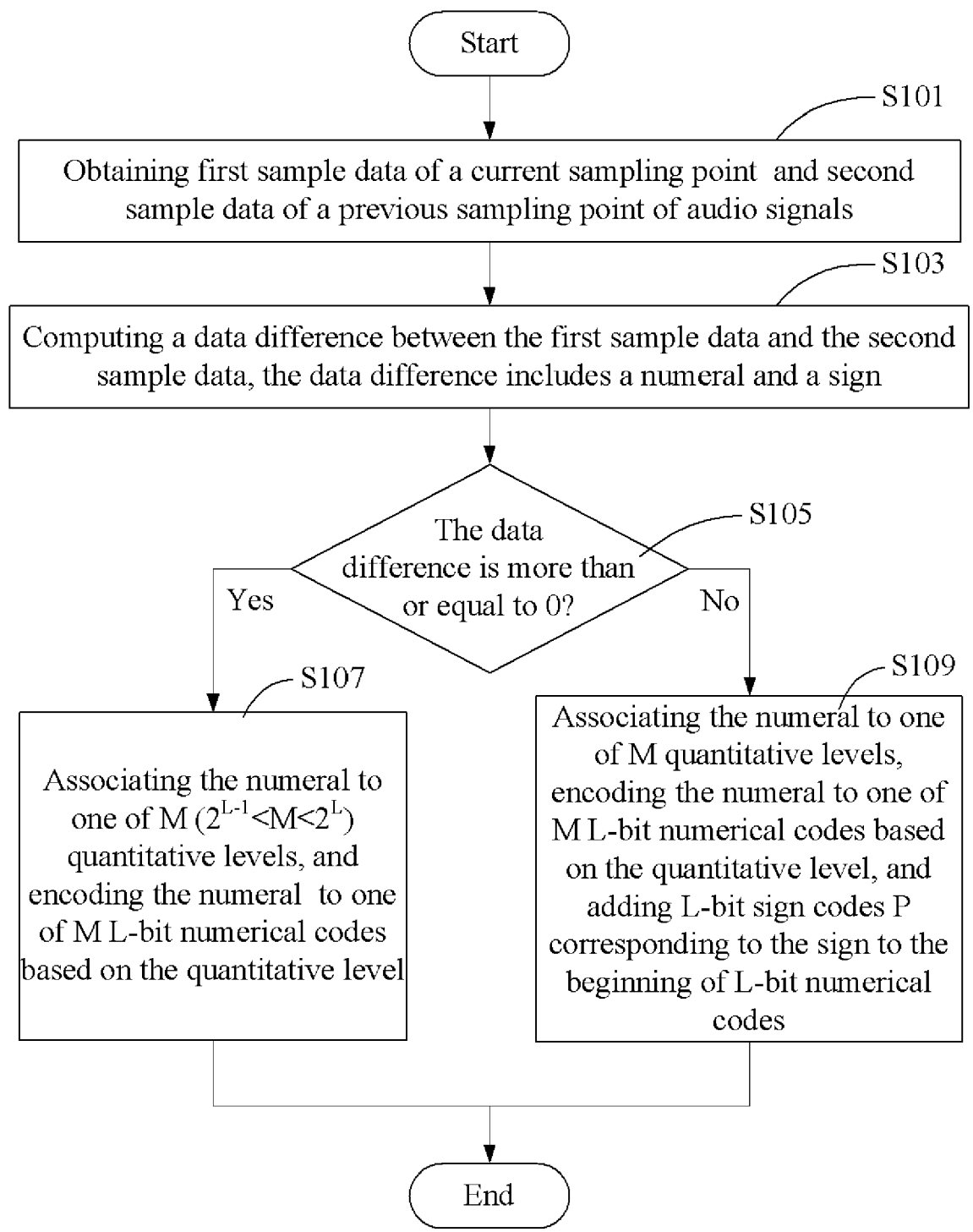
FIG. 1 is a flowchart of an encoding method in accordance with an exemplary embodiment.

The present disclosure provides an encoding method and system implementing the method for encoding audio signals to L-bit code streams. Referring to FIG. 1, the encoding method includes the following steps.

In step S101, sampling a current point of the audio signals to obtain first sample data, and reading second sample data of a previous sampling point of the audio signals.

In step S103, computing a data difference between the first sample data of the current sampling point and the second sample data of the previous sampling point. The data difference includes a numeral and a sign.

In step S105, determining whether the data difference is more than or equal to 0. If the data difference is more than or equal to 0, step S107 is implemented. If the data difference is less than 0, step S109 is implemented.

In step S107, associating the numeral of the data difference to one of M ($2^{L-1}$<M<$2^L$) quantitative levels, and encoding the numeral of the data difference to one of M L-bit numerical codes based on the quantitative level of the numeral of the data difference.

In step S109, associating the numeral of the data difference to one of M quantitative levels, then encoding the numeral of the data difference to one of M L-bit numerical codes based on the quantitative level, and then adding L-bit sign codes P, corresponding to the sign of the data difference, to beginning of the L-bit numerical codes. The sign codes P are not the same as the M numerical codes. The sign codes P may be one of $2^L$−M of $2^L$ L-bit codes except for M L-bit numerical codes.

To be easily understood, in the embodiment, encoding the audio signals to 4-bit code streams (L=4), and quantifying the audio signals to 15 quantitative levels (M=15) is used as an example for illustration. 4 bits can be used to make $2^4$ (16) 4-bit codes to represent a variety of data difference, and the 16 4-bit codes include 0000, 0001, 0010, 0011, 0100, 0101, 0110, 0111, 1000, 1001, 1010, 1011, 1100, 1101, 1110 and 1111. In the embodiment, the numeral of the data difference may be encoded to one of 4-bit codes 0000~1110. The sign of the data difference may be encoded as 1111, that is, the sign codes may be 1111.

In use, when the audio signal is encoded to L-bit code streams, the numeral of the data difference and the sign of the data difference between the first sample data of the current sampling point and the second sample data of the previous sampling point are separately encoded, thus the numeral of the data difference is encoded to L bits. Relative to the numeral of the data difference being encoded to L−1 bits by a differential pulse-code modulation in the related art, sound qualities of the audio signals are improved.

Figure 2:
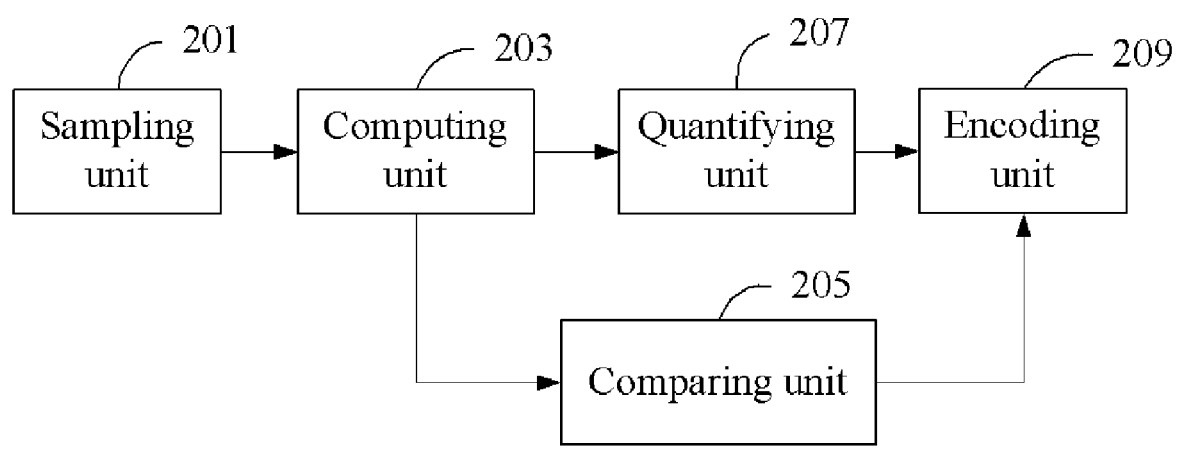
FIG. 2 is a block diagram of an encoding system of FIG. 1 in accordance with an exemplary embodiment.

Referring to FIG. 2, an encoding system 200 for encoding audio signals includes a sampling unit 201, a computing unit 203, a comparing unit 205, a quantifying unit 207, and an encoding unit 209.

The sampling unit 201 is used for obtaining sample data of sampling points of the audio signals such that continuous-time analog audio signals are converted to discrete-time digital audio signals. The sample data include first sample data of a current sampling point and second sample data of a previous sampling point.

The computing unit 203 is used for computing a data difference between the first sample data of the current sampling point and the second sample data of the previous sampling point. The difference value includes a numeral and a sign.

The comparing unit 205 is used for determining whether the data difference is more than or equal to 0, and outputting a determining result.

The quantifying unit 207 is used for associating the numeral of the data difference to one of M ($2^{L-1}$<M<$2^L$) quantitative level.

The encoding unit 209 is connected with the comparing unit 205 and the quantifying unit 207. The encoding unit 209 is used for encoding the numeral of the data difference according to the determining result. If the determining result is that the data difference is more than or equal to 0, the encoding unit 209 encodes the numeral of the data difference to one of M L-bit numerical codes based on the quantitative level of the numeral of the data difference.

If the determining result is that the data difference is less than the 0, the encoding unit 209 encodes the numeral of the data difference to one of M L-bit numerical codes based on the quantitative level of the numeral of the data difference, and then adding L-bit sign codes P, corresponding to the sign of the data difference, to the beginning of the L-bit numerical codes of the numeral of the data difference. The sign codes P are not the same as the M L-bit numerical codes. The sign codes P may be one of $2^L$−M of $2^L$ L-bit codes except for M L-bit numerical codes. In the embodiment, L is 4, and M is 15.

In use, when the audio signal is encoded to L-bit code streams, the numeral of the data difference and the sign of the data difference between the first sample data of the current sampling point and the second sample data of the previous sampling point are separately encoded, thus the numeral of the data difference is encoded to L bits. Relative to the numeral of the data difference being encoded to L−1 bits by a differential pulse-code modulation in the related art, sound qualities of the audio signals are improved.

It is to be understood, however, that even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A method for encoding audio signals to L-bit code streams implemented by an encoding system, the encoding system comprising a sampling unit, a computing unit, a comparing unit, a quantifying unit, and an encoding unit, the method comprising:

the sampling unit obtaining first sample data of a current sampling point and second sample data of a previous sampling point of the audio signals;

the computing unit computing a data difference between the first sample data of the current sampling point and the second sample data of the previous sampling point, the data difference comprising a numeral and a sign;

the comparing unit determining whether the data difference is equal to or more than 0;

the quantifying unit quantifying the numeral of the data difference; and the encoding unit encoding the numeral of the data difference with or without the sign according to a determining result as to whether the data difference is equal to or more than 0;

wherein if the data difference is equal to or more than 0, the quantifying unit associates the numeral of the data difference to one of M quantitative levels, wherein $2^{L-1}<M<2^L$, and the encoding unit encodes the numeral of the data difference to one of M L-bit numerical codes based on the quantitative level of the numeral of the data difference.

2. The method according to claim 1, further comprising:

if the data difference is less than 0, associating the numeral of the data difference to one of M quantitative levels, then encoding the numeral of the data difference to one of M L-bit numerical codes based on the quantitative level of the numeral of the data difference, and then adding L-bit sign codes P, corresponding to the sign of the data difference, to the beginning of the L-bit numerical codes of the numeral of the data difference.

3. The method according to claim 2, wherein sign codes P are not the same as the M numerical codes, the sign codes P is one of $2^L-M$ of $2^L$ L-bit codes except for M L-bit numerical codes.

4. The method according to claim 3, wherein L=4, M=15.

5. The method according to claim 4, wherein the numeral of the data difference is encoded to one of 4-bit codes 0000~1110, the sign codes P are encoded to 1111.

6. An encoding system for encoding audio signals to L-bit code streams, comprising:

a sampling unit obtaining sample data of sampling points of audio signals, the sample data comprising first sample data of a current sampling point and second sample data of a previous sampling point;

a computing unit computing a data difference between the first sample data of the current sampling point and the second sample data of the previous sampling point, the data difference comprising a numeral and a sign;

a comparing unit determining whether the data difference is more than or equal to 0 and outputting a determining result;

a quantifying unit quantifying the numeral of the data difference; and an encoding unit encoding the numeral of the data difference with or without the sign according to the determining result wherein if the determining result is that the data difference is more or equal to 0, the quantifying unit associates the numeral of the data difference to one of M quantitative levels, wherein $2^{L-1}<M<2^L$, the encoding unit encodes the numeral of the data difference to one of M L-bit numerical codes based on the quantitative level of the numeral of the data difference.

7. The encoding system according to claim 6, wherein if the determining result is that the data difference is less than the 0, the quantifying unit associates the numeral of the data difference to one of M quantitative levels, the encoding unit encodes the numeral of the data difference to one of M L-bit numerical codes based on the quantitative level of the numeral of the data difference, and then adds L-bit sign codes P, corresponding to the sign of the data difference, to beginning of the L-bit numerical codes of the numeral of the data difference.

8. The encoding system according to claim 7, wherein the sign codes P are not the same as the M numerical codes, and the sign codes P is one of $2^L-M$ of $2^L$ L-bit codes except for M L-bit numerical codes.

9. The encoding system according to claim 8, wherein L is 4, and M is 15.

10. An encoding system, comprising:

a sampling unit obtaining sample data of sampling points of audio signals, the sample data comprising first sample data of a current sampling point and second sample data of a previous sampling point;

a computing unit computing a data difference between the first sample data of the current sampling point and the second sample data of the previous sampling point, the data difference comprising a numeral and a sign;

a comparing unit determining whether the data difference is more than or equal to 0 and outputting a determining result;

a quantifying unit quantifying the numeral of the data difference; and an encoding unit encoding the numeral of the data difference with or without the sign according to the determining result;

wherein if the determining result is that the data difference is less than the 0, the quantifying unit associates the numeral of the data difference to one of M quantitative levels, wherein $2^{L-1}<M<2^L$; the encoding unit encodes the numeral of the data difference to one of M L-bit numerical codes based on the quantitative level of the numeral of the data difference, and then adds L-bit sign codes P, corresponding to the sign of the data difference, to beginning of the L-bit numerical codes of the numeral of the data difference; the sign codes P are not the same as the M numerical codes, and the sign codes P is one of $2^L-M$ of $2^L$ L-bit codes except for M L-bit numerical codes.

11. The encoding system according to claim 10, wherein L is 4, and M is 15.

* * * * *